United States Patent
Tsirkin

(10) Patent No.: US 9,740,519 B2
(45) Date of Patent: Aug. 22, 2017

(54) CROSS HYPERVISOR MIGRATION OF VIRTUAL MACHINES WITH VM FUNCTIONS

(71) Applicant: Red Hat Israel, Ltd., Raanana (IL)

(72) Inventor: Michael S. Tsirkin, Yoknearm Illit (IL)

(73) Assignee: Red Hat Israel, Ltd., Raanana (IL)

( * ) Notice: Subject to any disclaimer, the term of this patent is extended or adjusted under 35 U.S.C. 154(b) by 100 days.

(21) Appl. No.: 14/631,619

(22) Filed: Feb. 25, 2015

(65) Prior Publication Data
US 2016/0246636 A1      Aug. 25, 2016

(51) Int. Cl.
G06F 9/455  (2006.01)
H04L 29/08  (2006.01)
G06F 9/50   (2006.01)

(52) U.S. Cl.
CPC ........ G06F 9/45558 (2013.01); G06F 9/5027 (2013.01); H04L 67/34 (2013.01); G06F 2009/4557 (2013.01); G06F 2009/45575 (2013.01); H04L 67/1095 (2013.01)

(58) Field of Classification Search
CPC ............... G06F 9/45558; G06F 9/5027; G06F 2009/4557; H04L 67/1097; H04L 67/1095; H04L 67/1091
See application file for complete search history.

(56) References Cited

U.S. PATENT DOCUMENTS

| | | | |
|---|---|---|---|
| 6,802,062 B1 * | 10/2004 | Oyamada | G06F 9/45558 718/1 |
| 8,185,893 B2 | 5/2012 | Hyser et al. | |
| 8,656,482 B1 | 2/2014 | Tosa et al. | |
| 8,910,160 B1 * | 12/2014 | Patwardhan | G06F 9/4856 718/1 |
| 2008/0127182 A1 * | 5/2008 | Newport | G06F 9/4856 718/1 |
| 2012/0042034 A1 * | 2/2012 | Goggin | G06F 9/4856 709/216 |
| 2013/0276057 A1 | 10/2013 | Smith et al. | |
| 2014/0013326 A1 | 1/2014 | Neiger et al. | |
| 2014/0157260 A1 | 6/2014 | Balani et al. | |
| 2014/0173628 A1 | 6/2014 | Ramakrishnan | |
| 2014/0189194 A1 | 7/2014 | Sahita et al. | |
| 2014/0283056 A1 | 9/2014 | Bachwani et al. | |

(Continued)

OTHER PUBLICATIONS

Yanlin Li et al., "MiniBox: A Two-Way Sandbox for x86 Native Code," CMU-CyLab-14-001, CyLab, Carnegie Mellon University, Feb. 21, 2014, [retrieved Nov. 19, 2014], 18 pages, Internet: <http://repository.cmu.edu/cgi/viewcontent.cgi?article=1123&context=cylab>, Pittsburgh, PA.

(Continued)

*Primary Examiner* — Syed Roni
(74) *Attorney, Agent, or Firm* — Lowenstein Sandler LLP

(57) ABSTRACT

A hypervisor executing on a source host receives a request to migrate a virtual machine from the source host to a destination host. Responsive to determining that the virtual machine is executing a VM function component, the hypervisor on the source host pauses the migration of the virtual machine. Responsive to determining that the VM function component has completed executing the hypervisor on the source host resumes the migration of the virtual machine to the destination host.

20 Claims, 5 Drawing Sheets

(56) References Cited

U.S. PATENT DOCUMENTS

2014/0298335 A1   10/2014   Regev et al.

OTHER PUBLICATIONS

No Author, "VMware vCenter Multi-Hypervisor Manager 1.1 Release Notes," VMware Support, Apr. 25, 2013, [retrieved Nov. 19, 2014], 6 pages, Internet: <https://www.vmware.com/support/mhm/doc/vcenter-multi-hypervisor-manager-11-release-notes.html>.

David Weinstein, "Advanced x86: Virtualization with VT-x, Part 2," 2012, Open Security Training, [retrieved Nov. 19, 2014], 164 pages, Internet: http://opensecuritytraining.info/AdvancedX86-VTX_files/Virtualization_Part2. pptx>.

* cited by examiner

CROSS HYPERVISOR MIGRATION OF VIRTUAL MACHINES WITH VM FUNCTIONS

TECHNICAL FIELD

The present disclosure is generally related to computer systems, and more particularly, to virtual machine migration in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system." The hypervisor can configure a particular function with special privileges to be executed on behalf of a virtual machine so that packets may be transferred between virtual machines without requiring an exit to the hypervisor. This is referred to as a "VM function."

In multiple host environments, a running virtual machine or group of virtual machines can be moved from one host to another without disconnecting or terminating the virtual machine. Memory, storage, and network connectivity of the virtual machines can be transferred from the source host machine to a destination host machine. The process is referred to as "live migration."

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
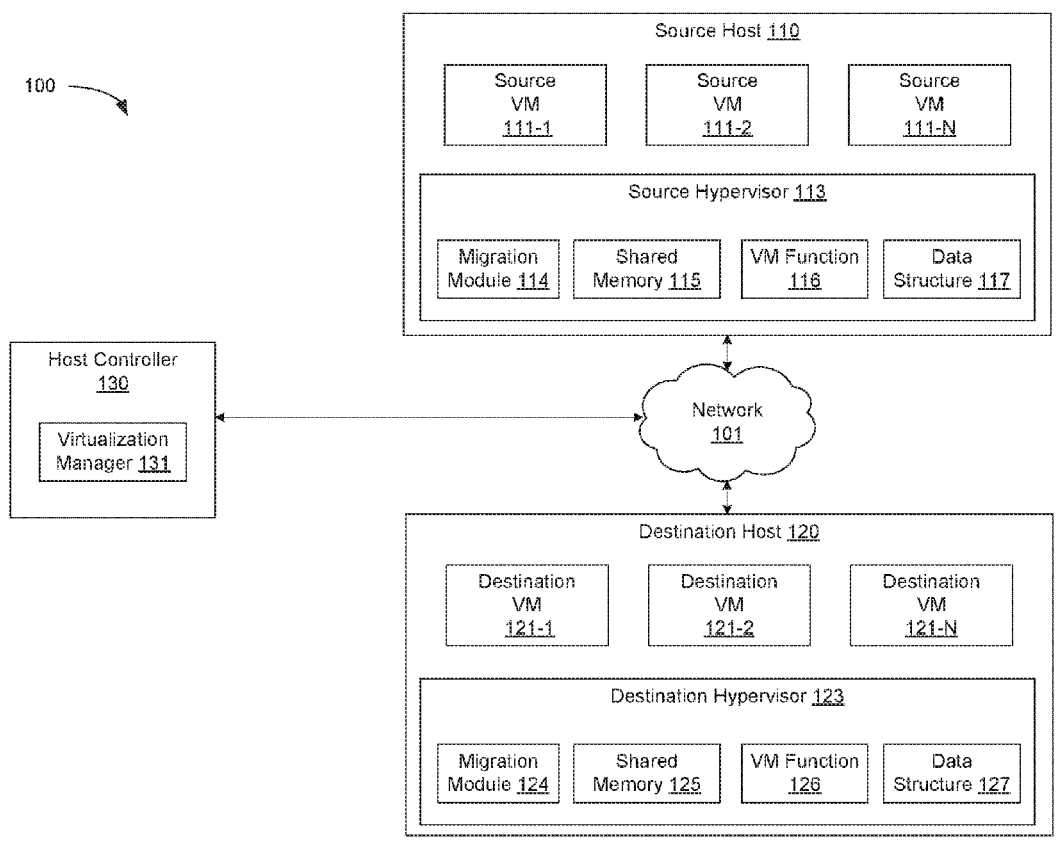
FIG. 1 depicts a high-level component diagram of an example computer system architecture, in accordance with one or more aspects of the present disclosure.

Described herein are methods and systems by which a virtual machine may be migrated with an associated VM function from a source host to a destination host. In a virtualized environment, a hypervisor may configure a VM function with special privileges to be executed on behalf of a virtual machine. For example, a VM function can provide an effective means of facilitating communication between virtual machines without requiring an exit to the hypervisor. When a virtual machine is migrated from one host to another, the VM function should be migrated together with the virtual machine. However, if the VM function is permitted to access the internal state of the hypervisor, migrating across hypervisor versions can become problematic, as all interfaces used by the VM function would need to be maintained across all hypervisors in an environment. Similarly, a VM function may incorporate logic that depends on the presence of a particular data structure of the hypervisor (e.g., a particular shared memory space, linked list, or tree structure in memory).

Attempting to migrate the virtual machine with the VM function from the source hypervisor to a destination hypervisor that is not similarly configured (e.g., the data structures supporting the VM function on the source are different from those on the destination) can result in the failure of the VM function after the migration has been completed. This can be particularly problematic during live migration when attempting to migrate a virtual machine while it is in the process of executing a VM function. Migration of a VM function with a virtual machine can often involve either that the virtual machine be completely shut down on the source and restarted on the destination (eliminating live migration of a virtual machine as an option entirely), or that all hypervisors in an environment be configured with identical data structures (severely limiting how a virtualized environment may be implemented and maintained).

Aspects of the present disclosure address the above noted deficiency by coupling the VM function to the hypervisor in which it will execute. VM functions may be implemented in a multi-hypervisor environment to permit more efficient migration by maintaining a consistent application binary interface (ABI) across hypervisors. The internals of the VM function can be completely tied to the hypervisor in which it executes, thus eliminating the need to migrate the VM function code along with the virtual machine. In an illustrative example, a hypervisor of a source host may receive a request to migrate a virtual machine on the source host to a destination host. The migration may be initiated by a virtualization management system, the hypervisor on the source host, or in any other similar manner. In certain implementations, the hypervisor may migrate the virtual machine to the destination host by migrating a portion of the state of the virtual machine to the destination host. The portion of the state of the virtual machine may comprise a predetermined state of various components of the virtual machine that are necessary for the virtual machine to begin execution on the destination host. For example, the portion of the virtual machine may comprise a device state, the state of CPU registers, the pages of memory that are currently being accessed by the virtual machine, or the like. The state of the virtual machine may be migrated by copying the state from the source host to the destination host directly through the network, placing the state in a shared space for the destination host to retrieve, or in any other manner.

Upon receiving the request to migrate the virtual machine, the hypervisor on the source host may first determine whether the virtual machine is in the process of executing a VM function component. In some implementations, the hypervisor may determine that a virtual machine is executing a VM function component by identifying a dedicated memory space within hypervisor memory that stores the execution state of a VM function component. For example, the hypervisor may identify a register space, shared memory space in hypervisor memory, an extended page table pointer (EPTP), or the like. An EPTP can provide a mapping between the guest physical memory address within a virtual machine to the associated host physical address within hypervisor memory. Once identified, the hypervisor may read the contents of the memory space, and determine the execution status of the VM function component in view of the contents of the register space. For example, an indicator or flag within the memory space can be set when a VM function component is executing and reset when the VM function component completes execution. If the hypervisor reads the memory space with the VM function component execution indicator set, it can determine that the VM function component is executing. Conversely, if the VM function component execution indicator is not set, the hypervisor can determine that the VM function component is not executing.

Responsive to determining that the virtual machine targeted for migration is executing a VM function component, the hypervisor can pause the migration of the virtual machine to the destination host until the VM function component has completed execution. In some implementations, the hypervisor can pause the migration of the virtual machine entirely (e.g., not transmitting any further data to the destination hypervisor). Alternatively, the hypervisor may pause the completion of the migration, permitting the transmission of some portion of the state of the virtual machine, but not permitting the migration to complete. As noted above, the portion of the state of the virtual machine may comprise a device state, the state of CPU registers, the pages of memory that are currently being accessed by the virtual machine, or the like.

The hypervisor may receive a notification from the VM function component to indicate that the VM function component has completed executing. In an illustrative example, the hypervisor may configure an area of memory accessible to the VM function component that can be modified by the hypervisor to trigger the VM function component to issue an exit upon completing execution. The hypervisor may store a Boolean flag, a series of bits in a register, or the like. The hypervisor may modify the virtual machine (e.g., modifying the virtual machine control structure (VMCS)) to cause the VM function component to switch to hypervisor mode upon execution of a VM function exit instruction. A virtual machine control structure (VMCS) may be an area of memory used to pass control of and access to resources (e.g., memory state, processor state, register contents, etc.) between the virtual machine and the hypervisor. Alternatively, the VM function component code can be modified to insert an instruction that can always issue an exit to the hypervisor (e.g., the last instruction of the VM function component can issue the exit just prior to completion).

Responsive to determining that the VM function component has completed executing, the hypervisor may resume the migration of the virtual machine to the destination host. In implementations where the migration was paused entirely, the migration may then be resumed. In implementations where only the completion of the migration was paused, any portion of the state of the virtual machine not yet migrated may be migrated to the destination, and the migration may then be permitted to complete.

As noted above, the state of the virtual machine may be migrated by copying the state from the source host to the destination host directly through the network, placing the state in a shared space for the destination host to retrieve, or in any other manner. In some implementations, the hypervisor on the source host may migrate the virtual machine to the destination host without also migrating the VM function component to the destination host. If the hypervisor on the source host does migrate the VM function component to the destination host along with the state of the virtual machine, the hypervisor on the destination host may discard the VM function component received by the hypervisor of the source host. The hypervisor on the destination host may receive the execution state of the migrated virtual machine on the destination host. The hypervisor on the destination host can then load the execution state of the migrated virtual machine, load the VM function component code associated with the migrated virtual machine into a memory space on the destination host, and start the migrated virtual machine on the destination host.

The VM function component code on the destination host can be configured with an ABI that is consistent with that of the source host regardless of the underlying data structures implemented on both hosts. Thus, while the underlying function code and data structures use by the VM function component may be different between the source and destination hosts (and any other hosts in the computer network), the interface exposed to the migrated VM will appear the same. For example, if the ABI includes a "get element" command, it will obtain the element from whatever data structure is present in the applicable hypervisor. If the source hypervisor implements a linked list data structure, the VM function component will access the linked list to obtain the element. If the destination hypervisor implements a tree structure, the VM function component will access the tree structure to obtain the element.

Once the virtual machine has been started on the destination host, the hypervisor on the destination host may notify the hypervisor on the source host that the migration has completed. The hypervisor on the destination host may notify the source host via, for example, an interrupt request, a message written to a data structure in a shared memory location, or a message sent through the network. Subsequently, the hypervisor on the source host may complete any cleanup required to free resources previously allocated to the virtual machine prior to migration. In some implementations, the hypervisor on the source host may then discard the VM function component code on the source host that was used by the virtual machine prior to migration. Alternatively, if another virtual machine on the source host has access to the same VM function component code, the hypervisor may retain the code for use by the other virtual machine.

Aspects of the present disclosure are thus capable of simplifying maintenance of the hypervisor by coupling VM function components to the hypervisor in which they will execute. More particularly, aspects of the present disclosure allow seamless migration of a virtual machine that uses a VM function component by migrating the virtual machine when it is not executing the VM function component code, thereby reducing resulting VM function component failure due to differences in underlying hypervisor data structures.

FIG. 1 depicts a high-level component diagram of an illustrative example of a network architecture 100, in accordance with one or more aspects of the present disclosure. One skilled in the art will appreciate that other architectures for network architecture 100 are possible, and that the implementation of a network architecture utilizing examples of the invention are not necessarily limited to the specific architecture depicted by FIG. 1.

The network architecture 100 includes one or more source hosts 110 coupled to one or more destination hosts 120 over a network 101. The network 101 may be a private network (e.g., a local area network (LAN), wide area network (WAN), intranet, etc.) or a public network (e.g., the Internet). The source hosts 110 and destination hosts 120 may also be coupled to a host controller 130 (via the same or a different network or directly). Host controller 130 may be an independent machine such as a server computer, a desktop computer, etc. Alternatively, the host controller 130 may be part of the source host 110 or destination host 120.

Source Host 110 may comprise server computers or any other computing devices capable of running one or more source virtual machines (VMs) 111-1 through 111-N where N is a positive integer. Each source VM 111 is a software implementation of a machine that executes programs as though it was a physical machine. Each source VM 111 may run a guest operating system (OS) that may be different from one virtual machine to another. The guest OS may include Microsoft Windows, Linux, Solaris, Mac OS, etc.

Source host 110 may additionally comprise a source hypervisor 113 that emulates the underlying hardware platform for the source VMs 111. The source hypervisor 113 may also be known as a virtual machine monitor (VMM) or a kernel-based hypervisor. The source hypervisor 113 may comprise migration module 114, shared memory 115, VM function 116, and data structure 117. Migration module 114 can manage the source-side tasks required for migration of a VM (e.g., source VMs 111) running on source host 110 that is executing VM function 116 to a destination host 120, as described in detail below with respect to FIGS. 2 and 3. The migration module 114 can initiate migration of a source VM 111, determine the execution state of VM function 116, and monitor the status of the migration state of the VM during migration.

Migration module 114 may use shared memory 115 to store information for use with migrating one or more source VMs 111. Shared memory 115 may include shared memory space, register space, or EPTP space that can be shared between hypervisor 113 and VM function 116. VM function 116 can modify shared memory 115 to notify migration module 114 of the execution status of VM function 116. Additionally, migration module 114 can modify shared memory 115 to control whether VM function 116 issues an exit when it has completed execution.

VM function 116 may include logic that that may be executed on behalf of one or more source VMs 111 to provide special privileges. The internals of VM function 116 may be completely tied to source hypervisor 113 in which it executes, thus eliminating the need to migrate VM function 116 code along with a source VM 111. VM function 116 can be configured internally to use data structure 117 to provide privileged functionality to one or more source VMs 111. VM function 116 can be configured with an ABI that is consistent across both source host 110 and destination host 120 regardless of the components of data structure 117. VM function 116 can access shared memory 115 to notify hypervisor 113 of VM function execution state as well as to drive triggering an exit to hypervisor 113 upon the completion of VM function 116 execution.

Destination Host 120 may comprise server computers or any other computing devices capable of running one or more destination virtual machines (VMs) 121-1 through 121-N where N is a positive integer. Each destination VM 121 is a software implementation of a machine that executes programs as though it was a physical machine. Each destination VM 121 may run a guest operating system (OS) that may be different from one virtual machine to another. The guest OS may include Microsoft Windows, Linux, Solaris, Mac OS, etc.

The destination host 120 may additionally comprise a destination hypervisor 123 that emulates the underlying hardware platform for the destination VMs 121. The destination hypervisor 123 may also be known as a virtual machine monitor (VMM) or a kernel-based hypervisor. The destination hypervisor 123 may comprise migration module 124, shared memory 125, VM function 126, and data structure 127. Migration module 124 can manage the destination-side tasks for migration of a VM (e.g., destination VMs 121) from source host 110 as described in detail below with respect to FIG. 4. The migration module 124 can complete the migration of destination VM 121, start destination VM 121 on destination host 120, and load associated VM function 126 into hypervisor 123 memory for use by destination VM 121.

Migration module 124 may use shared memory 125 to store information for use with completing the migration of one or more destination VMs 121. Additionally, migration module 124 may use shared memory 125 for future migration of one or more destination VMs 121 to another host within computer network 100. Shared memory 125 may include shared memory space, register space, or EPTP space that can be shared between hypervisor 123 and VM function 126. VM function 126 can modify shared memory 125 to notify migration module 124 of the execution status of VM function 126. Additionally, migration module 124 can modify shared memory 125 to control whether VM function 126 issues an exit when it has completed execution.

VM function 126 may include logic that that may be executed on behalf of one or more destination VMs 121 to provide special privileges. The internals of VM function 126 may be completely tied to destination hypervisor 123 in which it executes, thus eliminating the need to migrate VM function 116 code from source host 110. VM function 126 can be configured internally to use data structure 127 to provide privileged functionality to one or more destination VMs 121. VM function 126 can be configured with an ABI that is consistent across both source host 110 and destination host 120 regardless of the components of data structure 127. VM function 126 can access shared memory 125 to notify hypervisor 123 of VM function execution state as well as to drive triggering an exit to hypervisor 123 upon the completion of VM function 126 execution.

A host controller 130 can manage the source VMs 111 and destination VMs 121. Host controller 130 may manage the allocation of resources from source host 110 to source VMs 111, the allocation of resources from destination host 120 to destination VMs 121. In addition, host controller 130 may initiate the migration of one or more VMs 111 destination host 120. In some implementations host controller 130 may run on a separate physical machine from source host 110 and destination host 120. Alternatively, host controller 130 may run locally on either source host 110 or destination host 120. The host controller 130 may include a virtualization manager 131 to perform the management operations described above.

Figure 2:
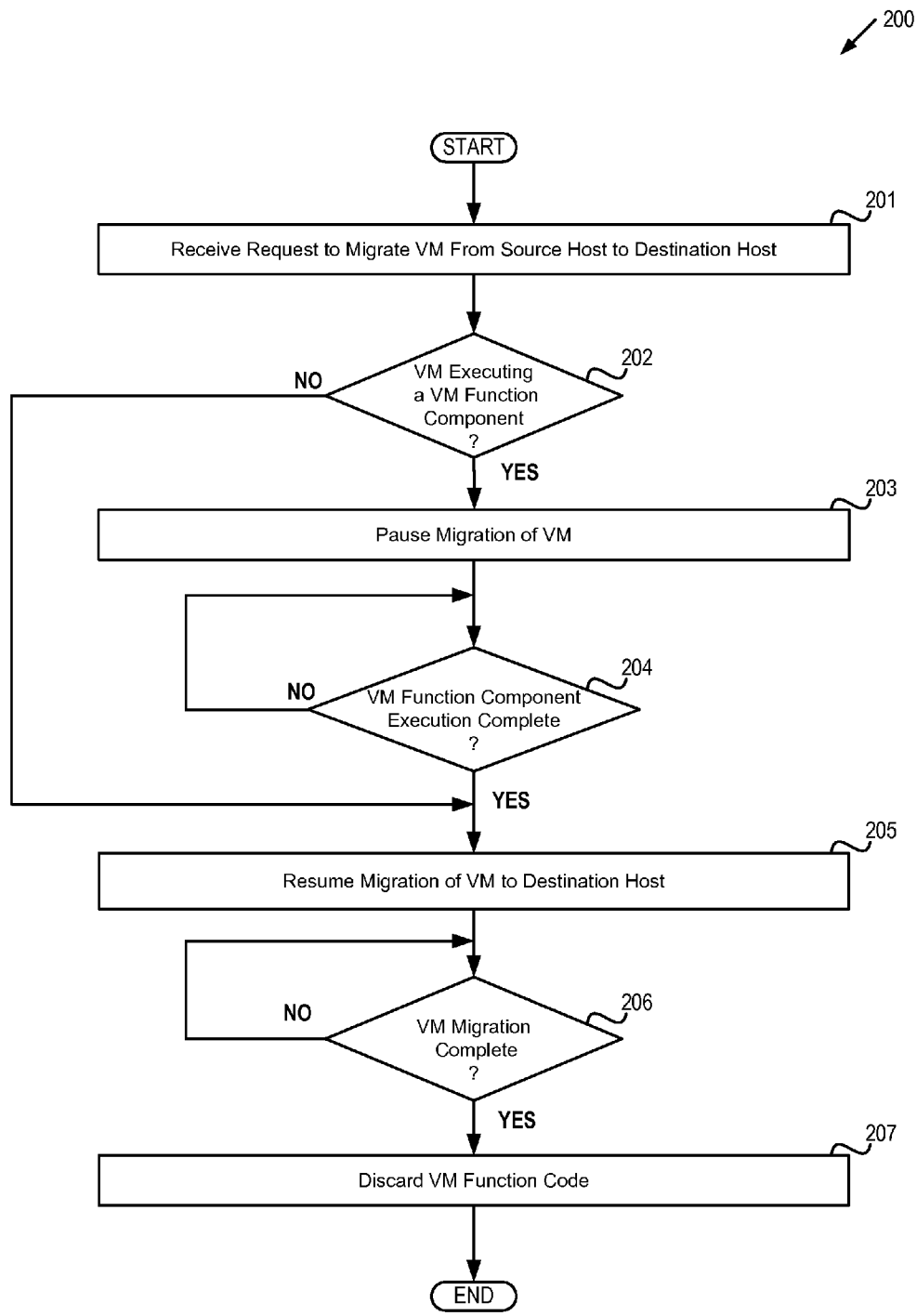
FIG. 2 depicts a flow diagram of a method for migrating virtual machine associated with a VM function, in accordance with one or more aspects of the present disclosure.

FIG. 2 depicts a flow diagram of an example method 200 for migrating virtual machine associated with a VM function. The method may be performed by processing logic that may comprise hardware (circuitry, dedicated logic, etc.), software (such as is run on a general purpose computer system or a dedicated machine), or a combination of both. In one illustrative example, method 200 may be performed by migration module 114 of source hypervisor 113 in FIG. 1.

Alternatively, some or all of method 200 might be performed by another machine. It should be noted that blocks depicted in FIG. 2 could be performed simultaneously or in a different order than that depicted.

At block 201, processing logic receives a request to migrate a virtual machine from a source host to a destination host. The migration may be initiated by a virtualization management system, the hypervisor on the source host, or in any other similar manner. At block 202, processing logic determines if the virtual machine is executing a VM function component. In an illustrative example, processing logic may determine that a virtual machine is executing a VM function component by accessing a dedicated memory space within hypervisor memory that stores the execution state of a VM function component as described in further detail below with respect to FIG. 3.

At block 203, processing logic can pause the migration of the virtual machine to the destination host until the VM function component has completed execution. In some implementations, processing logic can pause the migration of the virtual machine entirely (e.g., not transmitting any further data to the destination). Alternatively, processing logic may pause the completion of the migration, permitting the transmission of some portion of the state of the virtual machine, but not permitting the migration to complete. The portion of the state of the virtual machine may comprise a device state, the state of CPU registers, the pages of memory that are currently being accessed by the virtual machine, or the like.

At block 204, processing logic determines if the VM function component execution is complete. If so, processing continues to block 205. Otherwise, processing returns to block 204 to continue monitoring the status of VM function component execution. In certain implementations, processing logic may receive a notification from the VM function component to indicate that the VM function component has completed executing. In an illustrative example, the contents of a shared memory space (e.g., an indicator set by the hypervisor of the source host) may trigger the VM function component to issue an exit upon completing execution. Processing logic may modify the virtual machine control structure (VMCS) to cause the VM function component to switch to hypervisor mode upon execution of a VM function exit instruction. Alternatively, the VM function component code can be modified to insert an instruction that can always issue an exit to the hypervisor (e.g., the last instruction of the VM function component can issue the exit just prior to completion).

At block 205, processing logic resumes migration of the virtual machine to the destination host. In implementations where the migration was paused entirely, the migration may then be resumed. The state of the virtual machine may be migrated by copying the state from the source host to the destination host directly through the network, placing the state in a shared space for the destination host to retrieve, or in any other manner. In implementations where only the completion of the migration was paused, any portion of the state of the virtual machine not yet migrated may be migrated to the destination, and the migration may then be permitted to complete.

At block 206, processing logic determines whether the virtual machine migration has completed. In some implementations, processing logic may receive a notification from the destination host that migration has completed. Alternatively, processing logic can determine that migration has completed if a portion of the execution state of the virtual machine has been copied to the destination host. At block 207, processing logic discards the VM function component code from hypervisor memory of the source host. After block 207, the method of FIG. 2 terminates.

Figure 3:
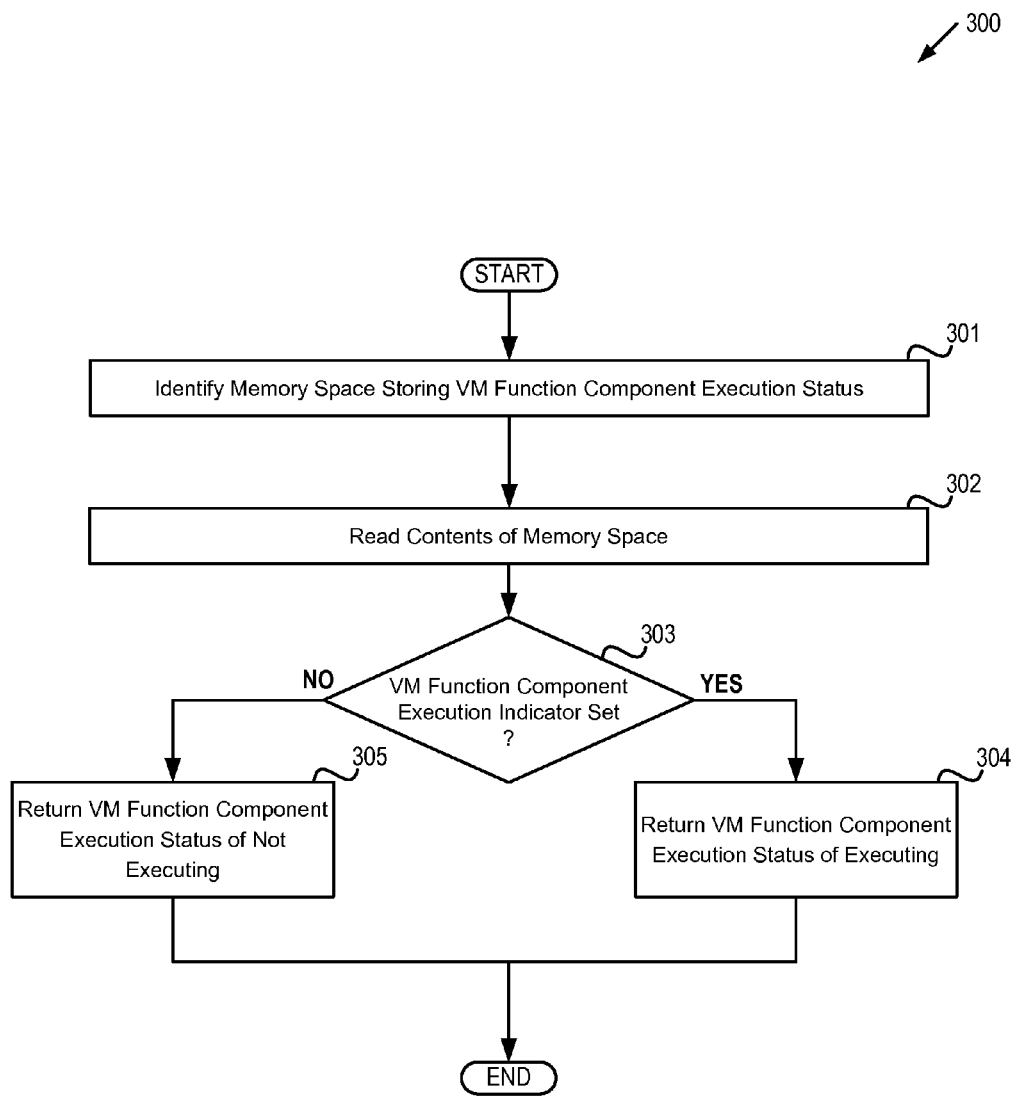
FIG. 3 depicts a flow diagram of a method for determining whether a VM is executing a VM function, in accordance with one or more aspects of the present disclosure.

FIG. 3 depicts a flow diagram of an example method 300 for determining whether a VM is executing a VM function. The method may be performed by processing logic that may comprise hardware (circuitry, dedicated logic, etc.), software (such as is run on a general purpose computer system or a dedicated machine), or a combination of both. In one illustrative example, method 300 may be performed by migration module 114 of source hypervisor 113 in FIG. 1. Alternatively, some or all of method 300 might be performed by another machine. It should be noted that blocks depicted in FIG. 3 could be performed simultaneously or in a different order than that depicted.

At block 301, processing logic identifies a memory space storing VM function component execution status. For example, processing logic may identify a register space, shared memory space in hypervisor memory, an extended page table pointer (EPTP), or the like. At block 302, processing logic reads the contents of the memory space identified at block 301. For example, an indicator or flag within the memory space can be set when a VM function component is executing and reset when the VM function component completes execution. If processing logic reads the memory space with the VM function component execution indicator set, it can determine that the VM function component is executing. Conversely, if the VM function component execution indicator is not set, the hypervisor can determine that the VM function component is not executing.

At block 303, processing logic determines whether a VM function component execution indicator is set. If so, processing proceeds to block 304, otherwise processing proceeds to block 305. At block 304, processing logic returns a VM function component execution status of executing. At block 305, processing logic returns a VM function component execution status of not executing. After either block 304 or block 305 completes, the method of FIG. 3 terminates.

Figure 4:
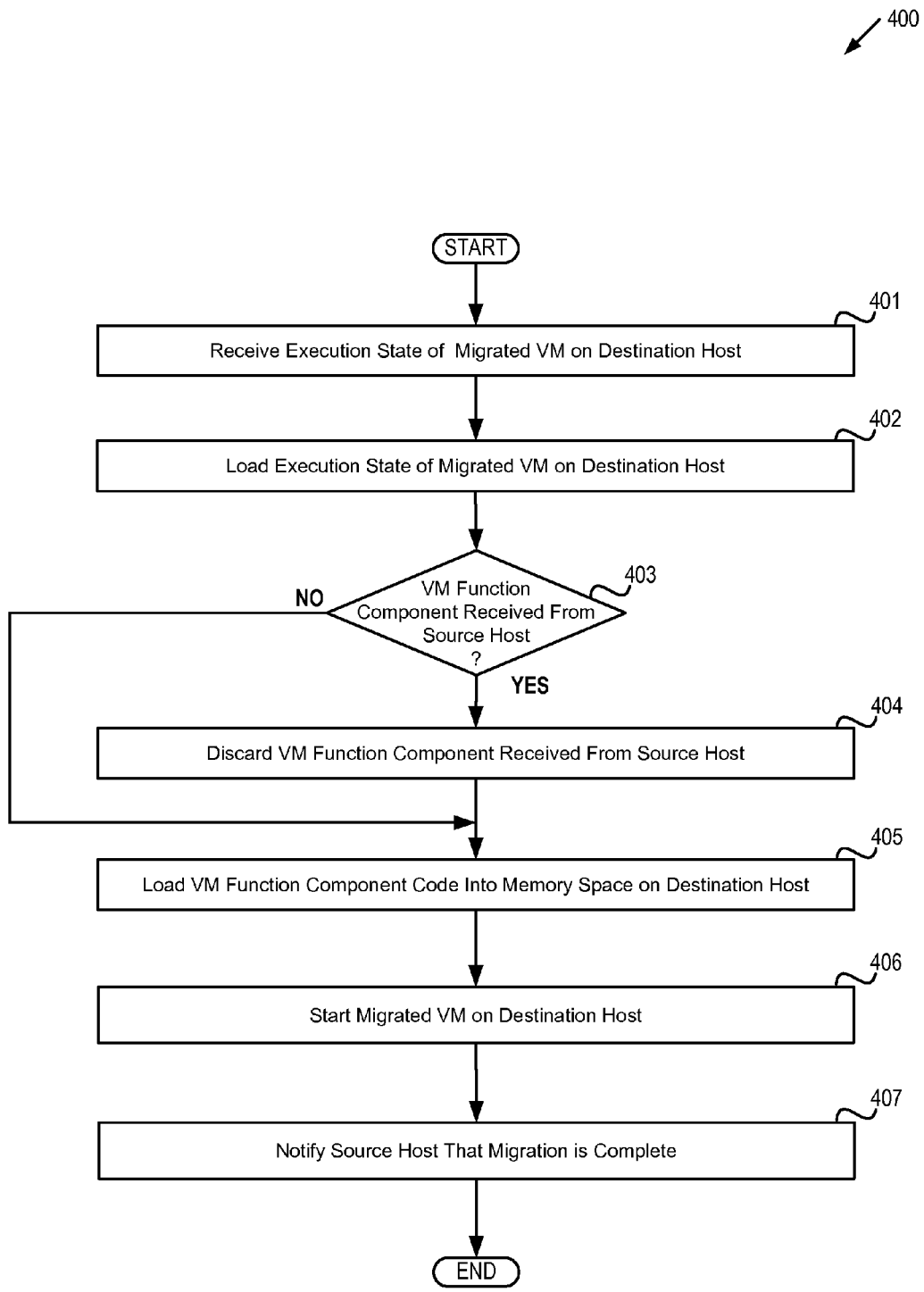
FIG. 4 depicts a flow diagram of a method for associating a VM function with a migrated virtual machine by a destination host, in accordance with one or more aspects of the present disclosure.

FIG. 4 depicts a flow diagram of an example method 400 for associating a VM function with a migrated virtual machine by a destination host. The method may be performed by processing logic that may comprise hardware (circuitry, dedicated logic, etc.), software (such as is run on a general purpose computer system or a dedicated machine), or a combination of both. In one illustrative example, method 400 may be performed by migration module 124 of destination hypervisor 123 in FIG. 1. Alternatively, some or all of method 400 might be performed by another machine. It should be noted that blocks depicted in FIG. 4 could be performed simultaneously or in a different order than that depicted.

At block 401, processing logic receives the execution state of a migrated virtual machine on a destination host. The execution state of the virtual machine may comprise a predetermined state of various components of the virtual machine that are necessary for the virtual machine to begin execution on the destination host. For example, the portion of the virtual machine may comprise a device state, the state of CPU registers, the pages of memory that are currently being accessed by the virtual machine, or the like. The state of the virtual machine may be migrated by copying the state from the source host to the destination host directly through the network, placing the state in a shared space for the destination host to retrieve, or in any other manner.

At block 402, processing logic loads the execution state of the migrated virtual machine on the destination host. At block 403, processing logic determines whether the VM function component has been migrated to the destination host along with the state of the migrated virtual machine. If so, processing continues to block 404, where processing logic discards the VM function component received from the source host. Otherwise, processing logic proceeds to block 405. At block 405, processing logic loads the VM function component code into the memory of the destination host. The VM function component code on the destination host can be configured with an ABI that is consistent with that of the source host regardless of the underlying data structures implemented on both hosts. Thus, while the underlying function code and data structures use by the VM function component may be different between the source and destination hosts (and any other hosts in the computer network), the interface exposed to the migrated VM will appear the same.

At block 406, processing logic starts the migrated virtual machine on the destination host. At block 407, processing logic notifies the source host that migration of the virtual machine has completed. Processing logic may notify the source host via, for example, an interrupt request, a message written to a data structure in a shared memory location, or a message sent through the network.

After block 405, the method of FIG. 4 terminates.

Figure 5:
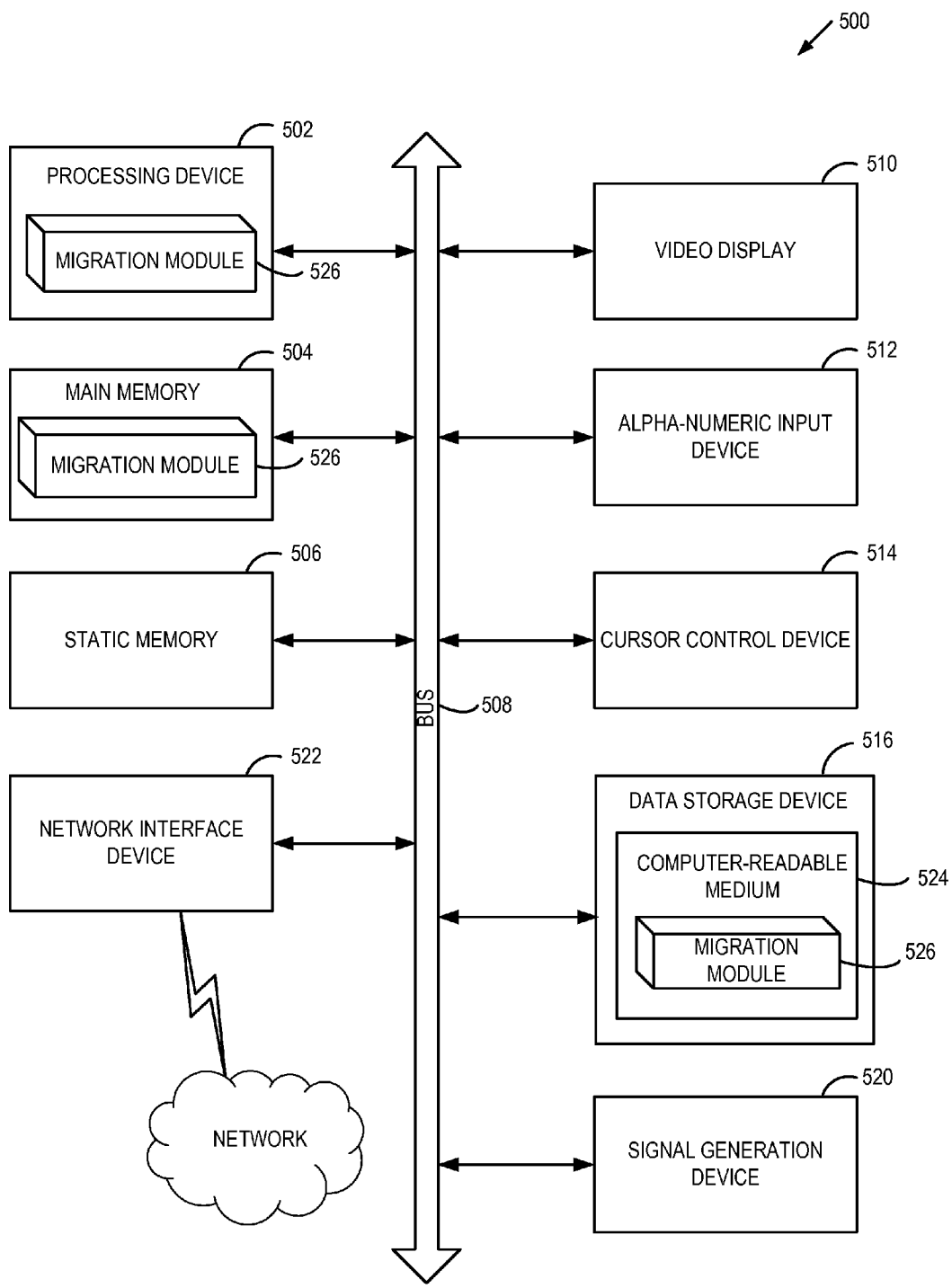
FIG. 5 depicts a block diagram of an illustrative computer system operating in accordance with examples of the invention.

FIG. 5 depicts an example computer system 500 which can perform any one or more of the methods described herein. In one example, computer system 500 may correspond to network architecture 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute migration module 526 for performing the operations and steps discussed herein (e.g., corresponding to the methods of FIGS. 2-4, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a computer-readable medium 524 on which is stored migration module 526 (e.g., corresponding to the methods of FIGS. 2-4, etc.) embodying any one or more of the methodologies or functions described herein. Migration module 526 may also reside, completely or at least partially, within the main memory 504 and/or within the processing device 502 during execution thereof by the computer system 500, the main memory 504 and the processing device 502 also constituting computer-readable media. Migration module 526 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "pausing," "resuming," "completing," "discarding," "reading," "loading," "starting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
    receiving, by a processing device executing a hypervisor on a source host, a request to migrate a virtual machine from the source host to a destination host;
    responsive to determining that the virtual machine is executing a VM function component, pausing, by the processing device executing the hypervisor on the source host, the migration of the virtual machine, wherein the VM function component comprises an executable component with special privileges to hypervisor memory; and
    responsive to determining that the VM function component has completed executing, resuming, by the processing device executing the hypervisor on the source host, the migration of the virtual machine to the destination host.

2. The method of claim 1, wherein resuming the migration comprises migrating the virtual machine to the destination host without also migrating the VM function component.

3. The method of claim 1, wherein determining that the virtual machine is executing the VM function component comprises:
    identifying at least one of a register space in hypervisor memory that stores an execution status of the VM function component, or a shared memory space that is modified by the VM function component that stores the execution status of the VM function component;
    reading contents of the at least one of the register space or the shared memory space; and
    determining the execution status of the VM function component in view of the contents of the at least one of the register space or the shared memory space.

4. The method of claim 1, wherein pausing the migration of the virtual machine to the destination host comprises:
    modifying the virtual machine to cause a switch to hypervisor mode upon execution of an exit instruction by the VM function component.

5. The method of claim 1, wherein determining that the VM function component has completed executing comprises receiving a notification from the VM function component to indicate that it has completed.

6. The method of claim 5, wherein the notification comprises a request from the VM function component to exit the VM function.

7. The method of claim 1, wherein a hypervisor of the destination host is to:
    responsive to receiving the VM function component from the source host, discard the VM function component received from the source host;

load VM function component code into a memory space on the destination host accessible to the virtual machine; and start the virtual machine on the destination host.

8. A computing apparatus comprising:
a memory; and
a processing device, operatively coupled to the memory, to execute a hypervisor on a source host to:
responsive to determining that a virtual machine selected for migration from a source host to a destination host is executing a VM function component, pause the migration of the virtual machine, wherein the VM function component comprises an executable component with special privileges to hypervisor memory;
responsive to determining that the VM function component has completed executing, resume the migration of the virtual machine to the destination host; and
responsive to completing the migration of the virtual machine to the destination host, discard the VM function component from the source host.

9. The apparatus of claim 8, wherein to determine that the virtual machine is executing the VM function component, the processing device is to:
identify at least one of a register space in hypervisor memory that stores an execution status of the VM function component, or a shared memory space that is modified by the VM function component that stores the execution status of the VM function component;
read contents of the at least one of the register space or the shared memory space; and
determine the execution status of the VM function component in view of the contents of the at least one of the register space or the shared memory space.

10. The apparatus of claim 8, wherein to pause the migration of the virtual machine to the destination host, the processing device is to:
modify the virtual machine to cause a switch to hypervisor mode upon execution of an exit instruction by the VM function component.

11. The apparatus of claim 8, wherein to determine that the VM function component has completed executing the processing device is to receive a notification from the VM function component to indicate that it has completed.

12. The apparatus of claim 11, wherein the notification comprises a request from the VM function component to exit the VM function.

13. The apparatus of claim 8, wherein a hypervisor of the destination host is to:
responsive to receiving the VM function component from the source host, discard the VM function component received from the source host;
load VM function component code into a memory space on the destination host accessible to the virtual machine; and
start the virtual machine on the destination host.

14. A non-transitory computer readable storage medium, having instructions stored therein, which when executed by a processing device of a computer system, cause the processing device to:

receive, by the processing device executing a hypervisor on a source host, a request to migrate a virtual machine from the source host to a destination host;
responsive to determining that the virtual machine is executing a VM function component, pause, by the processing device executing the hypervisor on the source host, the migration of the virtual machine, wherein the VM function component comprises an executable component with special privileges to hypervisor memory; and
responsive to determining that the VM function component has completed executing, resume, by the processing device executing the hypervisor on the source host, the migration of the virtual machine to the destination host.

15. The non-transitory computer readable storage medium of claim 14, wherein to resume the migration, the processing device is further to migrate the virtual machine to the destination host without also migrating the VM function component.

16. The non-transitory computer readable storage medium of claim 14, wherein to determine that the virtual machine is executing the VM function component the processing device is to:
identify at least one of a register space in hypervisor memory that stores an execution status of the VM function component, or a shared memory space that is modified by the VM function component that stores the execution status of the VM function component;
read contents of the at least one of the register space or the shared memory space; and
determine the execution status of the VM function component in view of the contents of the at least one of the register space or the shared memory space.

17. The non-transitory computer readable storage medium of claim 14, wherein to pause the migration of the virtual machine, the processing device is to:
modify the virtual machine to cause a switch to hypervisor mode upon execution of an exit instruction by the VM function component.

18. The non-transitory computer readable storage medium of claim 14, wherein to determine that the VM function component has completed executing, the processing device is to receive a notification from the VM function component to indicate that it has completed.

19. The non-transitory computer readable storage medium of claim 18, wherein the notification comprises a request from the VM function component to exit the VM function.

20. The non-transitory computer readable storage medium of claim 14, wherein a hypervisor of the destination host is to:
responsive to receiving the VM function component from the source host, discard the VM function component received from the source host;
load VM function component code into a memory space on the destination host accessible to the virtual machine; and
start the virtual machine on the destination host.

* * * * *